US012601960B2

(12) United States Patent
Kobayashi

(10) Patent No.: US 12,601,960 B2
(45) Date of Patent: Apr. 14, 2026

(54) CONTROL APPARATUS, INTERCHANGEABLE LENS, CONTROL METHOD, AND STORAGE MEDIUM

(71) Applicant: CANON KABUSHIKI KAISHA, Tokyo (JP)

(72) Inventor: Koya Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 441 days.

(21) Appl. No.: 18/338,522

(22) Filed: Jun. 21, 2023

(65) Prior Publication Data

US 2024/0019769 A1 Jan. 18, 2024

(30) Foreign Application Priority Data

Jul. 15, 2022 (JP) ................................. 2022-113847

(51) Int. Cl.
  *G03B 17/14* (2021.01)
  *G03B 13/34* (2021.01)
(52) U.S. Cl.
  CPC ............. *G03B 17/14* (2013.01); *G03B 13/34* (2013.01)

(58) Field of Classification Search
  None
  See application file for complete search history.

(56) References Cited

U.S. PATENT DOCUMENTS

2002/0114087 A1* 8/2002 Iikawa ..................... G02B 7/10
                                                      359/701

FOREIGN PATENT DOCUMENTS

JP            2019078930 A       5/2019

* cited by examiner

*Primary Examiner* — Phu Vu

(74) *Attorney, Agent, or Firm* — ROSSI, KIMMS & McDOWELL LLP

(57) ABSTRACT

A control apparatus is configured to control an interchangeable lens attachable to, detachable from, and communicable with an image pickup apparatus, and includes a unit. The control apparatus includes a memory storing instructions, and a processor that executes the instructions to determine whether the interchangeable lens is attached to the image pickup apparatus, control the unit using at least one of information from the image pickup apparatus and information from the interchangeable lens in a case where the interchangeable lens is attached to the image pickup apparatus, and control the unit using information from the interchangeable lens in a case where the interchangeable lens is not attached to the image pickup apparatus.

11 Claims, 11 Drawing Sheets

CONTROL APPARATUS, INTERCHANGEABLE LENS, CONTROL METHOD, AND STORAGE MEDIUM

BACKGROUND

Technical Field

One of the aspects of the embodiments relates to a control apparatus, an interchangeable lens, a control method, and a storage medium.

Description of Related Art

Interchangeable lenses for cameras having a variety of specifications have been prepared, and they are expected to be widely used for medical and industrial purposes due to their versatility because they have a common mount for each type. Japanese Patent Laid-Open No. 2019-78930 proposes a method of utilizing an interchangeable lens for an apparatus other than a camera.

The method disclosed in Japanese Patent Laid-Open No. 2019-78930 requires the apparatus to have communication means and a corresponding mount with the interchangeable lens.

The interchangeable lens generally has no power supply, and a unit in the interchangeable lens cannot be driven in a case where the interchangeable lens is not attached to the camera.

SUMMARY

A control apparatus according to one aspect of the disclosure is configured to control an interchangeable lens attachable to, detachable from, and communicable with an image pickup apparatus, and includes a unit. The control apparatus includes a memory storing instructions, and a processor that executes the instructions to determine whether the interchangeable lens is attached to the image pickup apparatus, control the unit using at least one of information from the image pickup apparatus and information from the interchangeable lens in a case where the interchangeable lens is attached to the image pickup apparatus, and control the unit using information from the interchangeable lens in a case where the interchangeable lens is not attached to the image pickup apparatus. An interchangeable lens including the above control apparatus, a control method corresponding to the above control apparatus, and a storage medium storing a program that causes a computer to execute the above control method constitute another aspect of the disclosure.

Further features of the disclosure will become apparent from the following description of embodiments with reference to the attached drawings.

DESCRIPTION OF THE EMBODIMENTS

Figure 1A:
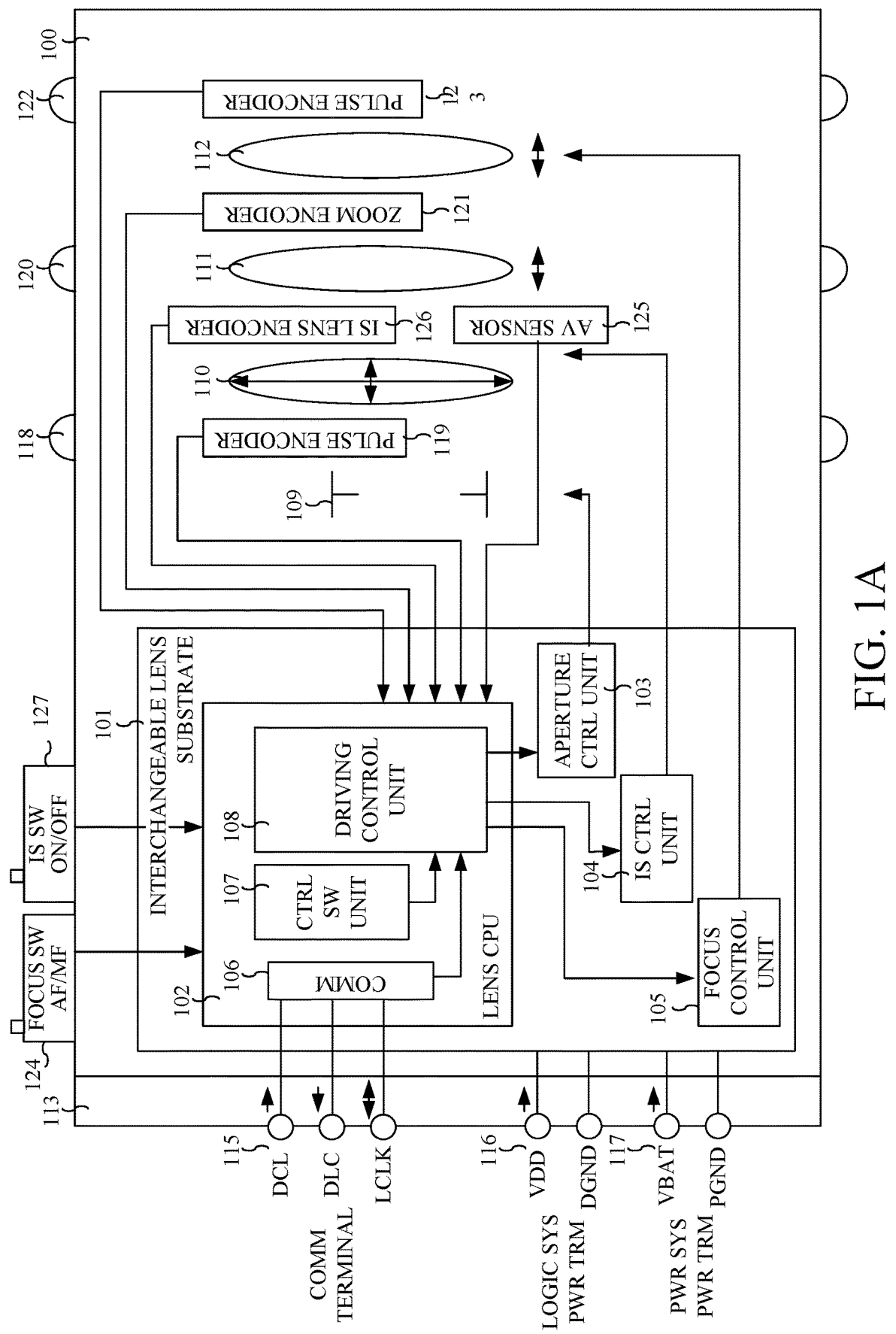
FIGS. 1A and 1B are block diagrams of an interchangeable lens according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1A is a block diagram of an interchangeable lens 100 according to this embodiment. The interchangeable lens 100 is attachable to, detachable from, and communicable with an image pickup apparatus.

The interchangeable lens 100 includes an interchangeable lens substrate (board) 101. The interchangeable lens substrate 101 includes an interchangeable lens CPU (control apparatus) 102, an aperture control unit 103, an image stabilization (IS) control unit 104, and a focus control unit 105. The interchangeable lens CPU 102 includes a communication unit (COMM) 106, a control switching (CTRL SW) unit 107, and a driving control unit 108.

The interchangeable lens 100 includes, as an imaging optical system, a variable aperture 109, an image stabilizing lens 110, a zoom lens 111, and a focus lens 112. The variable aperture 109 can change the size of the stop aperture in order to adjust a light amount passing through the imaging optical system. The image stabilizing lens 110 can reduce shake caused by camera shake or the like in the imaging optical system. The zoom lens 111 can change a focal length and an angle of view of the imaging optical system. The focus lens 112 can change the focal length of the imaging optical system.

Figure 1B:
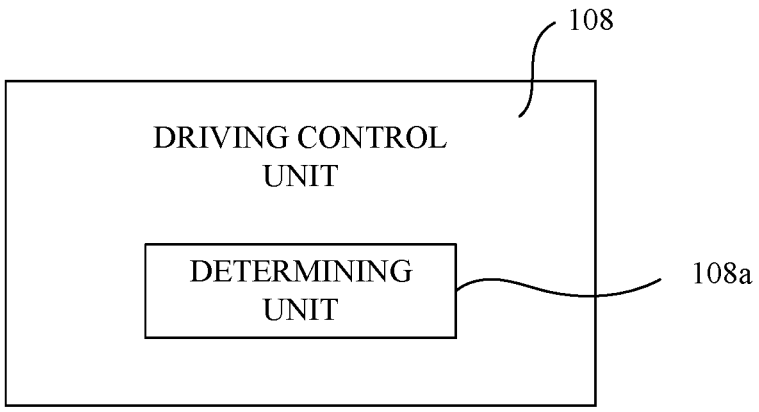

The driving control unit 108 controls the variable aperture 109 via the aperture control unit 103. The driving control unit 108 controls the image stabilizing lens 110 via the image stabilization control unit 104. The driving control unit 108 controls the focus lens 112 via the focus control unit 105. The driving control unit 108 includes a determining unit 108a configured to determine whether the interchangeable lens 100 is attached to the image pickup apparatus, as illustrated in FIG. 1B. The determining unit 108a may be provided inside the interchangeable lens CPU 102. The control switching unit 107 switches control of the driving control unit 108.

The interchangeable lens 100 further includes a lens mount (mount unit) 113 attachable to an image pickup apparatus or an accessory. The lens mount 113 includes communication terminals (DCL, DLC, LCLK) 115, logic system (main) power terminals (LOGIC SYS PWR TRM) (VDD, VDGN) 116, and power system (battery backup) power terminals (PWR SYS PWR TRM) (VBAT, PDND) 117. The interchangeable lens CPU 102 operates by receiving logic system power supply via the logic system power terminals 116. The communication unit 106 communicates with the image pickup apparatus or an accessory via the communication terminals 115. The aperture control unit 103, image stabilization control unit 104, and focus control unit 105 operate by receiving power system power supply via the power system power terminals 117. In this embodiment, the logic system power terminals 116 and the power system power terminals 117 constitute a first power receiver.

The interchangeable lens 100 includes a first operation ring (third operation member) 118 operable by a user, and a first pulse encoder 119 that detects a rotational operation amount of the first operation ring 118. The rotational operation amount of the first operation ring 118 detected by the first pulse encoder 119 is transmitted to the interchangeable lens CPU 102. An operation target of the first operation ring 118 is set by the camera 200.

The interchangeable lens 100 includes a second operation ring 120 operable by a user, and a zoom encoder 121. In a case where the second operation ring 120 is rotated, an unillustrated cam ring mechanically connected to the second operation ring 120 rotates. A cam groove portion provided in the cam ring moves the zoom lens 111 along the optical axis. A zoom encoder 121 detects the position of the zoom lens 111. The position of the zoom lens 111 detected by the zoom encoder 121 is transmitted to the interchangeable lens CPU 102.

The interchangeable lens 100 includes a third operation ring (first operation member) 122 operable by a user, a second pulse encoder 123 configured to detect a rotational operation amount of the third operation ring 122, and a focus switch (SW) 124. The rotational operation amount of the third operation ring 122 detected by the second pulse encoder 123 is transmitted to the interchangeable lens CPU 102. The focus switch 124 is a switch for switching between autofocus (AF) and manual focus (MF).

The interchangeable lens 100 includes an angular velocity (AV) sensor 125 that detects shake caused by camera shake or the like, an image stabilizing (IS) lens encoder 126 that detects the position of the image stabilizing lens 110, and an image stabilization switch (second operation member) 127. The image stabilization switch (IS SW) 127 is a switch for switching between turning on and turning off of the image stabilization.

Figure 2A:
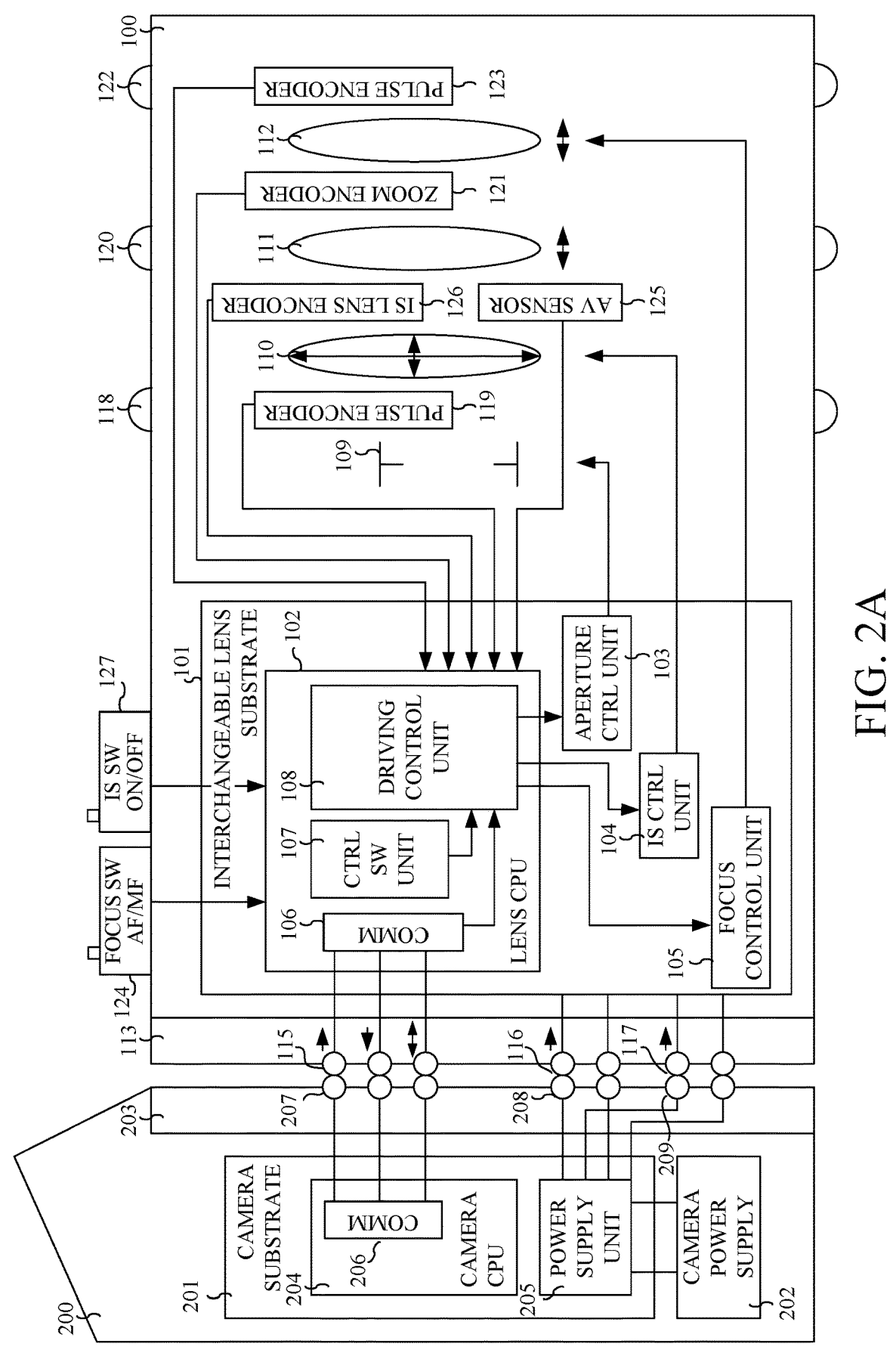
FIG. 2A illustrates a first configuration of the interchangeable lens according to the first embodiment.

FIG. 2A illustrates a first configuration in which the interchangeable lens 100 is attached to a camera (image pickup apparatus) 200. In the first configuration, the interchangeable lens 100 is powered by the camera 200.

The camera 200 includes a camera substrate 201, a camera power supply 202, and a camera mount 203. The camera substrate 201 includes a camera CPU 204 and a power supply unit 205. The camera CPU 204 includes a communication unit (COMM) 206. The camera mount 203 includes communication terminals 207, logic system power terminals 208, and power system power terminals 209. In a case where the interchangeable lens 100 is attached to the camera 200, the communication terminals 115 and the communication terminals 207 are connected to each other, the logic system power terminals 116 and the logic system power terminals 208 are connected to each other, and the power system power terminals 117 and the power system power terminals 209 are connected to each other.

Figure 2B:
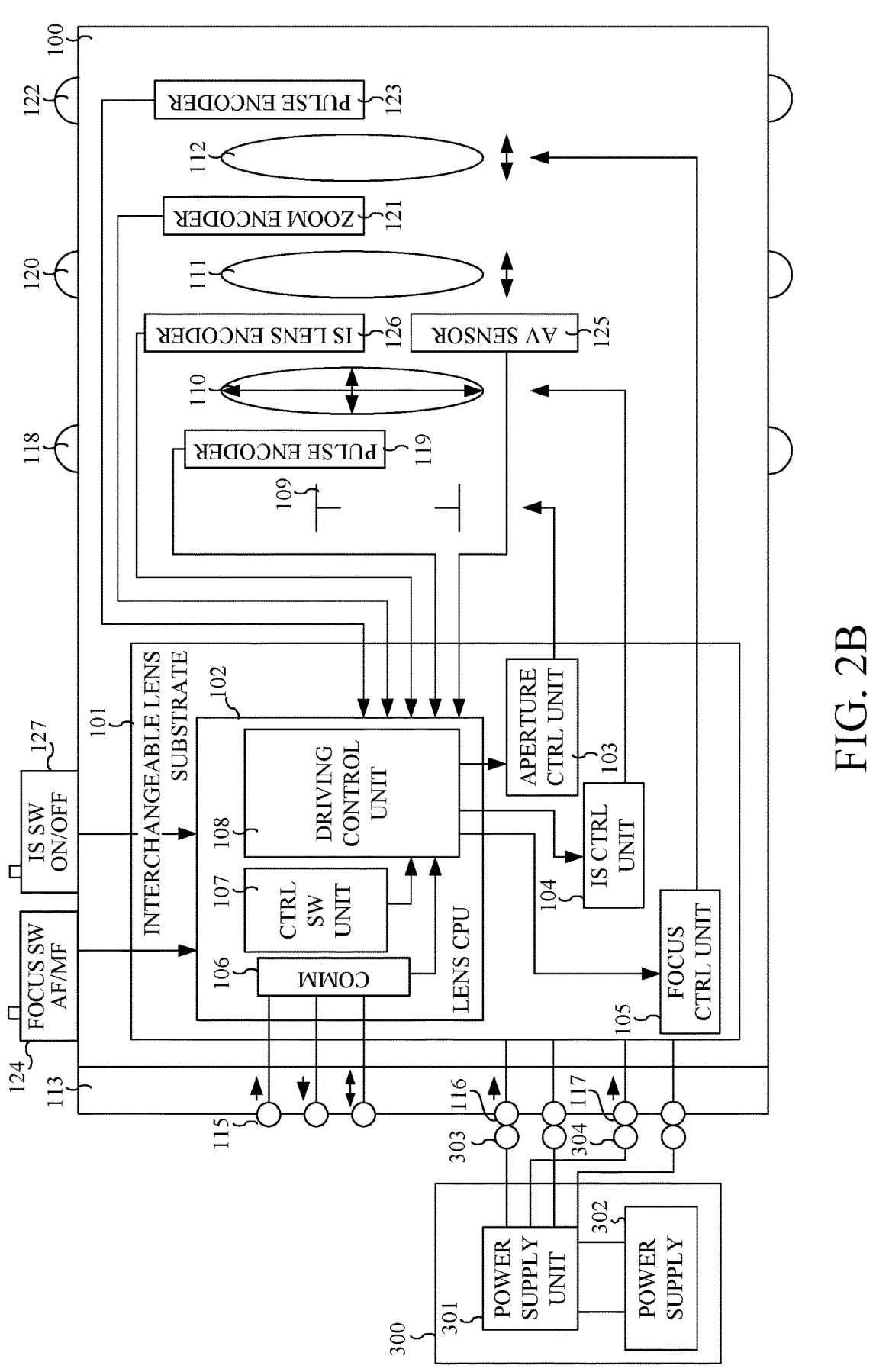
FIG. 2B illustrates a second configuration of the interchangeable lens according to the first embodiment.

FIG. 2B illustrates a second configuration in which the interchangeable lens 100 is connected to a power supply unit 300. In the second configuration, the interchangeable lens 100 is powered by the power supply unit 300.

The power supply unit 300 includes a power supply unit 301, a power supply 302, logic system power terminals 303, and power system power terminals 304. In a case where the interchangeable lens 100 is connected to the power supply unit 300, the logic system power terminals 116 and the logic system power terminals 303 are connected to each other, and the power system power terminals 117 and the power system power terminals 304 are connected to each other.

Figure 3A:
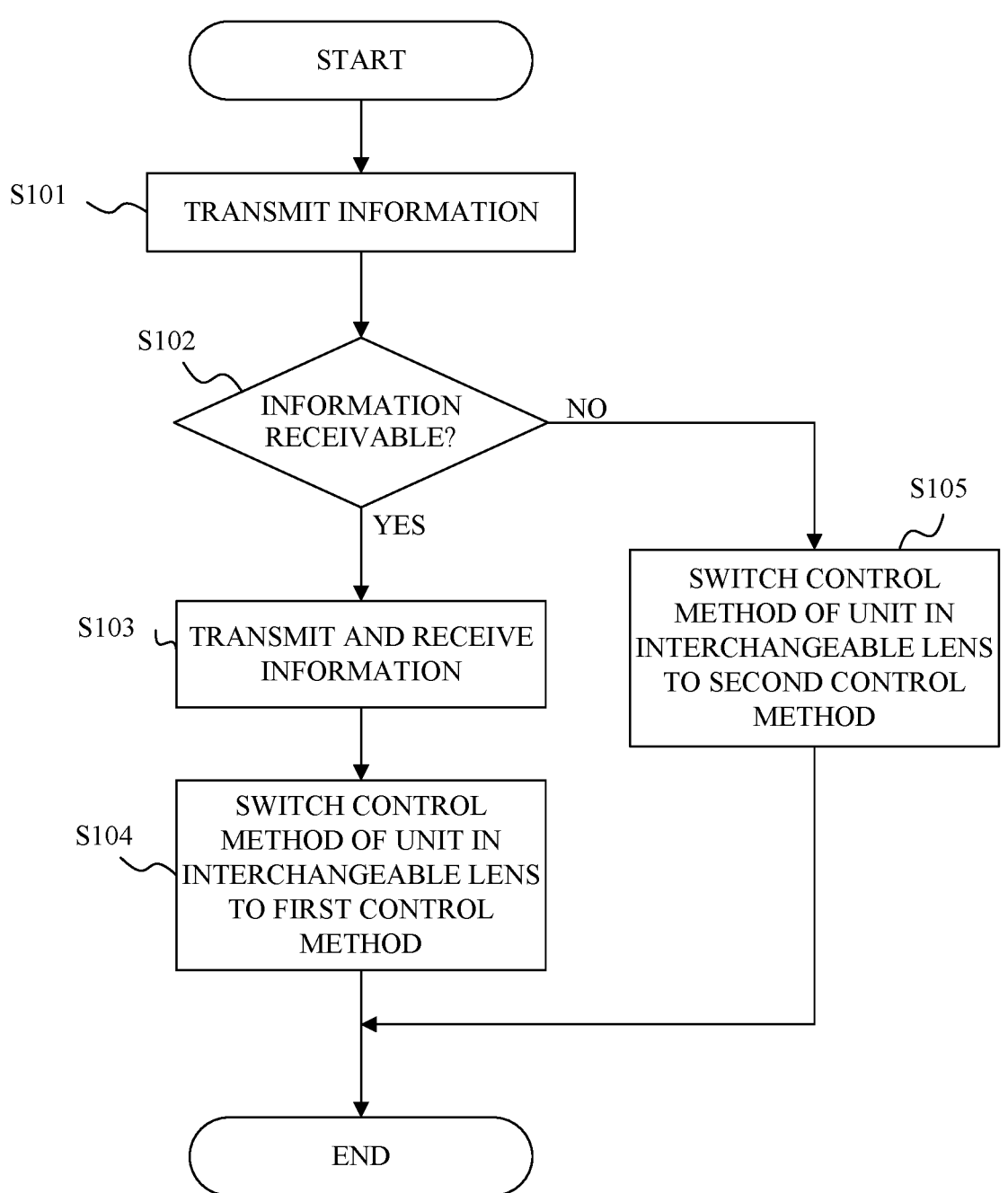
FIGS. 3A, 3B, and 3C are flowcharts illustrating switching processing of a control method of a unit in the interchangeable lens according to the first embodiment.
Figures 3B, 3C:
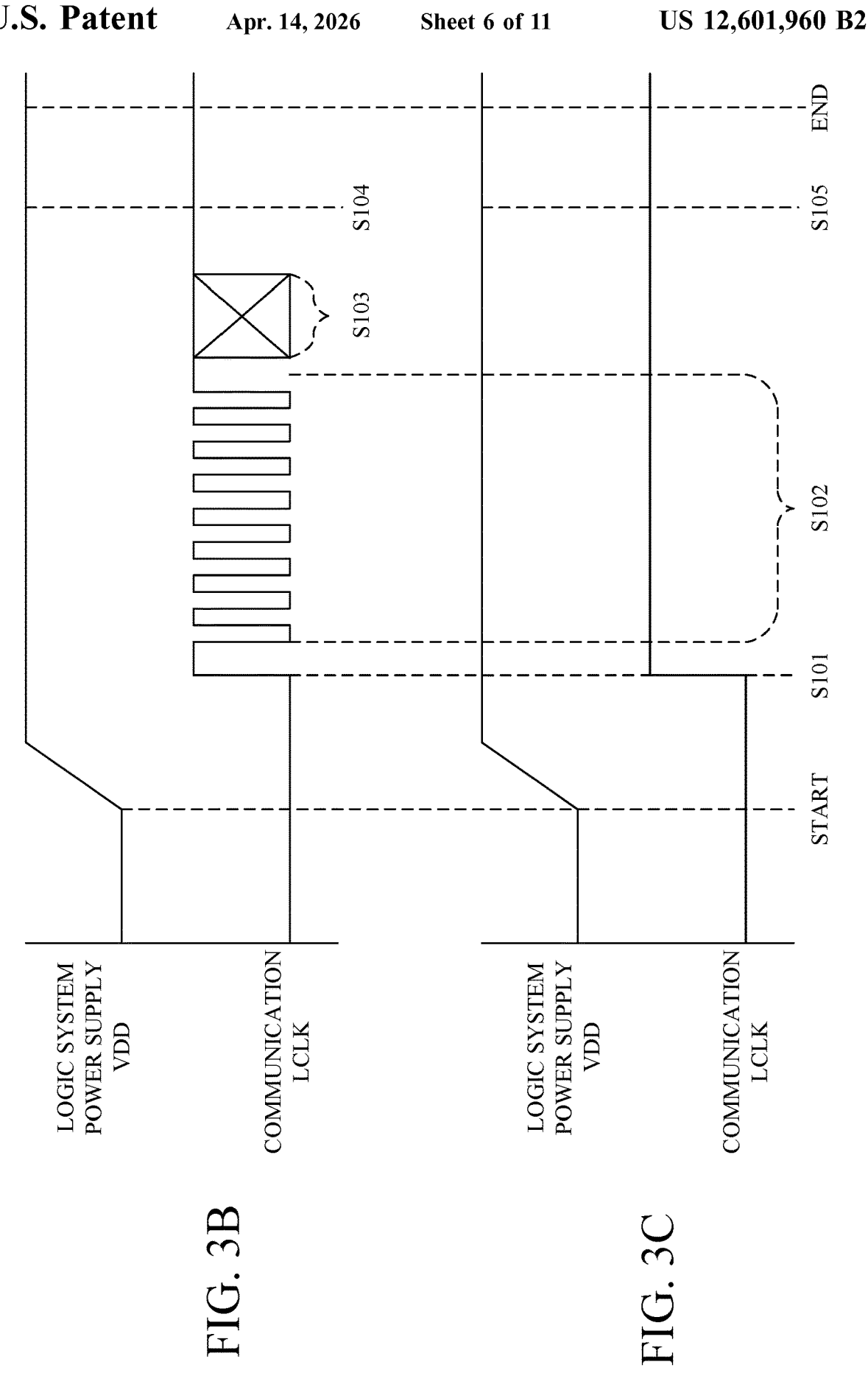

A description will now be given of switching processing of a control method of a unit in the interchangeable lens 100 according to this embodiment. FIG. 3A is a flowchart illustrating the switching processing of the control method of the unit in the interchangeable lens 100 according to this embodiment. This flow is started in a case where the logic system power terminals 116 receive the logic system power supply and the interchangeable lens CPU 102 is activated. FIGS. 3B and 3C illustrate a power supply signal and a communication signal of the logic system power supply in a case where the interchangeable lens 100 is in the first configuration and the second configuration, respectively.

In step S101, the interchangeable lens CPU 102 transmits information via the communication unit 106.

In step S102, the interchangeable lens CPU 102 determines whether the communication unit 106 can receive information. In a case where it is determined that the communication unit 106 can receive information, step S103 is executed. In a case where it is determined that the communication unit 106 cannot receive information, step S105 is executed.

In step S102, in a case where the interchangeable lens 100 is in the first configuration, the communication unit 106 receives information from the camera 200 via the communication unit 206. In a case where the interchangeable lens 100 is in the second configuration, the communication unit 106 cannot receive information because the communication terminals 115 are not connected.

In step S103, the interchangeable lens CPU 102 causes the communication unit 106 to transmit and receive information.

In step S104, the control switching unit 107 switches the control method of the unit in the interchangeable lens 100 by the driving control unit 108 to the first control method.

In step S105, the control switching unit 107 switches the control method of the unit in the interchangeable lens 100 by the driving control unit 108 to the second control method.

In this embodiment, in a case where the interchangeable lens 100 has the first configuration, the driving control unit 108 controls the units in the interchangeable lens 100 using the first control method. In a case where the interchangeable lens 100 has the second configuration, the driving control unit 108 controls the unit in the interchangeable lens 100 using the second control method.

In the first control method, in a case where AF is selected by the focus switch 124, the driving control unit 108 controls the focus lens 112 via the focus control unit 105 using information from the camera 200 received by the communication unit 106. In a case where MF is selected by the focus switch 124, the driving control unit 108 controls the focus lens 112 through the focus control unit 105 using the rotational operation amount of the third operation ring 122 transmitted to the interchangeable lens CPU 102. The driving control unit 108 controls the focus lens 112 in a focus mode set by the user in this embodiment, but may control the focus lens 112 in the focus mode based on information from the camera 200. The rotational operation amount of the third operation ring 122 is transmitted to the camera 200 by the communication unit 106.

The rotational operation amount of the first operation ring 118 transmitted to the interchangeable lens CPU 102 is transmitted to the camera 200 by the communication unit 106. The driving control unit 108 controls the operation target set by the camera 200.

The driving control unit 108 controls the image stabilizing lens 110 using information from the camera 200.

In the second control method, regardless of which one is selected by the focus switch 124, the driving control unit 108 controls the focus lens 112 via the focus control unit 105 using the rotational operation amount of the third operation ring 122 transmitted to the interchangeable lens CPU 102. That is, the driving control unit 108 controls the focus lens 112 in a manual focus mode.

The driving control unit 108 controls the variable aperture 109 via the aperture control unit 103 using the rotational operation amount of the first operation ring 118 transmitted to the interchangeable lens CPU 102.

The driving control unit 108 controls the image stabilizing lens 110 in a case where the image stabilization switch 127 is turned on.

As described above, according to the configuration according to this embodiment, the interchangeable lens 100 can control the unit in the interchangeable lens 100 even in a case where the interchangeable lens 100 is not attached to the camera 200.

In this embodiment, the determining unit 108a determines that the interchangeable lens 100 is attached to the camera 200 in a case where the communication unit 106 can receive information from the image pickup apparatus, but the disclosure is not limited to this example. The determining unit 108a may determine whether the interchangeable lens 100 is attached to the camera 200, by using the state of an operation unit that enables the user to select whether the interchangeable lens 100 is attached to the camera 200.

Second Embodiment

Figure 4:
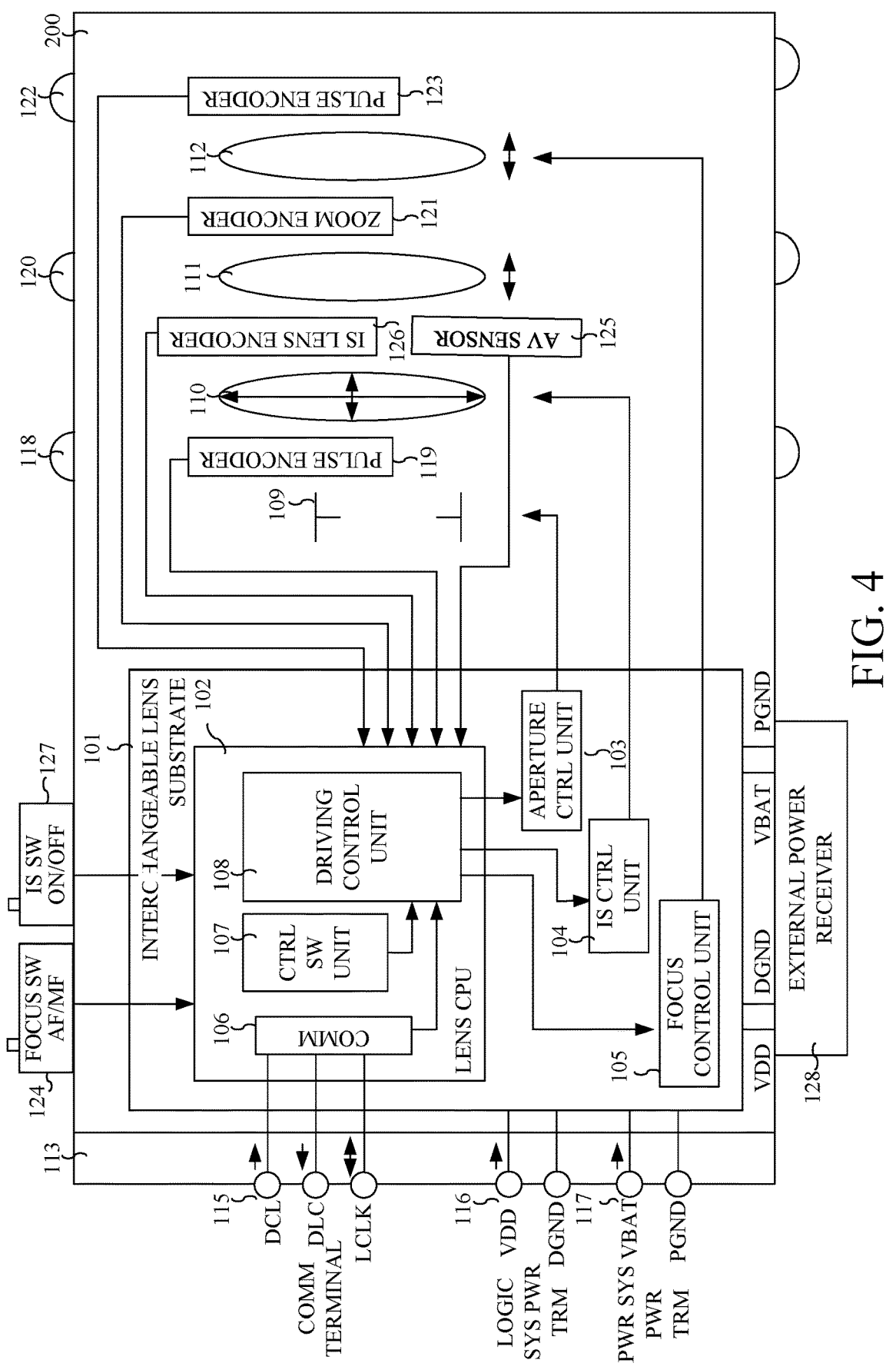
FIG. 4 is a block diagram of an interchangeable lens according to a second embodiment.

FIG. 4 is a block diagram of the interchangeable lens 500 according to this embodiment. The configuration of the interchangeable lens 500 is basically similar to that of the interchangeable lens 100 according to the first embodiment. This embodiment will discuss only a configuration different from that of the first embodiment and will omit a description of a similar configuration.

The interchangeable lens 500 includes an external power receiver (second power receiver) 128. The external power receiver 128 supplies logic system power supply and power system power supply to the interchangeable lens substrate 101 from the power received from the external power source.

Figure 5A:
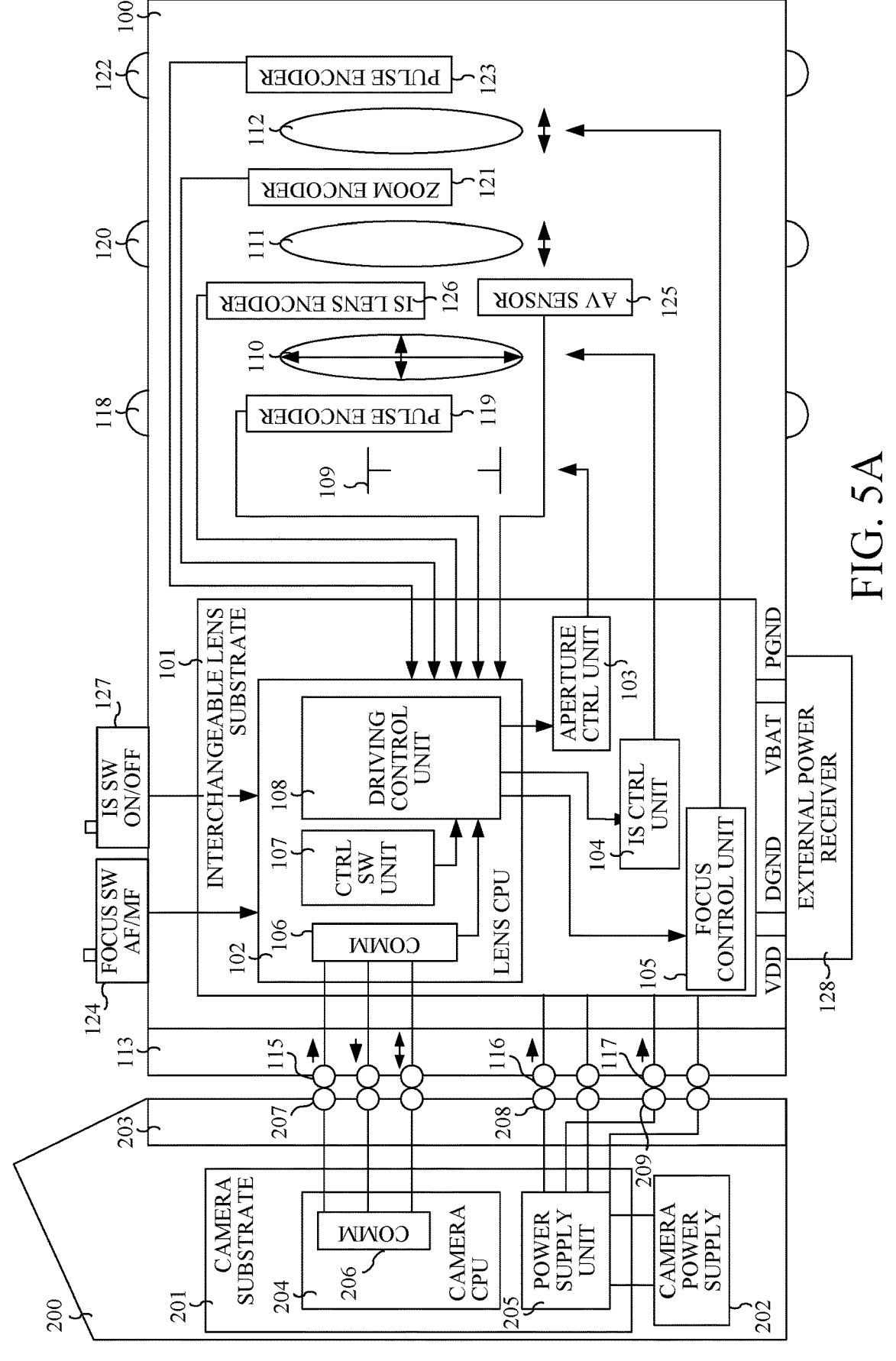
FIG. 5A illustrates a first configuration of the interchangeable lens according to the second embodiment.
Figure 5B:
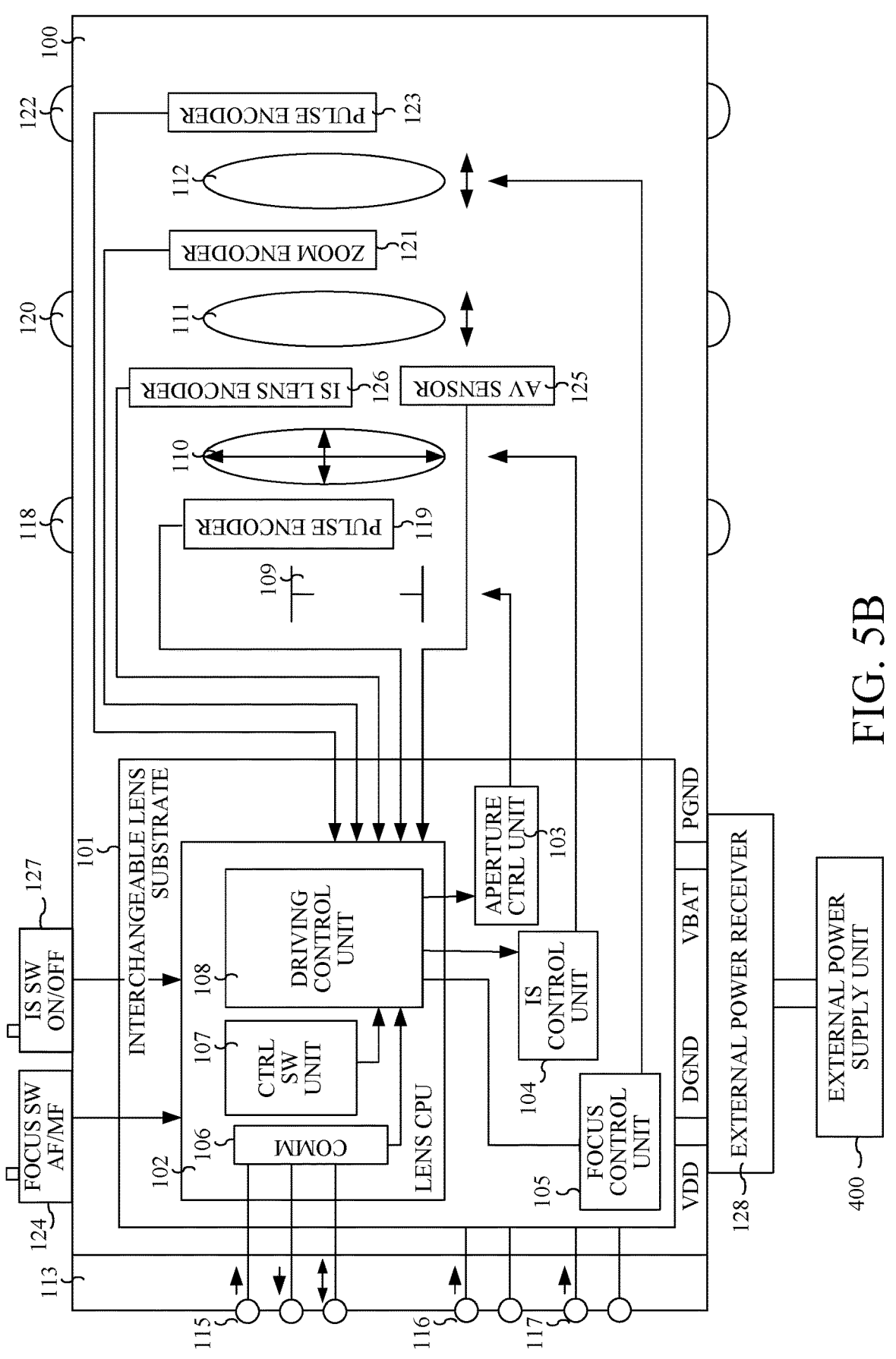
FIG. 5B illustrates a second configuration of the interchangeable lens according to the second embodiment.
Figure 5C:
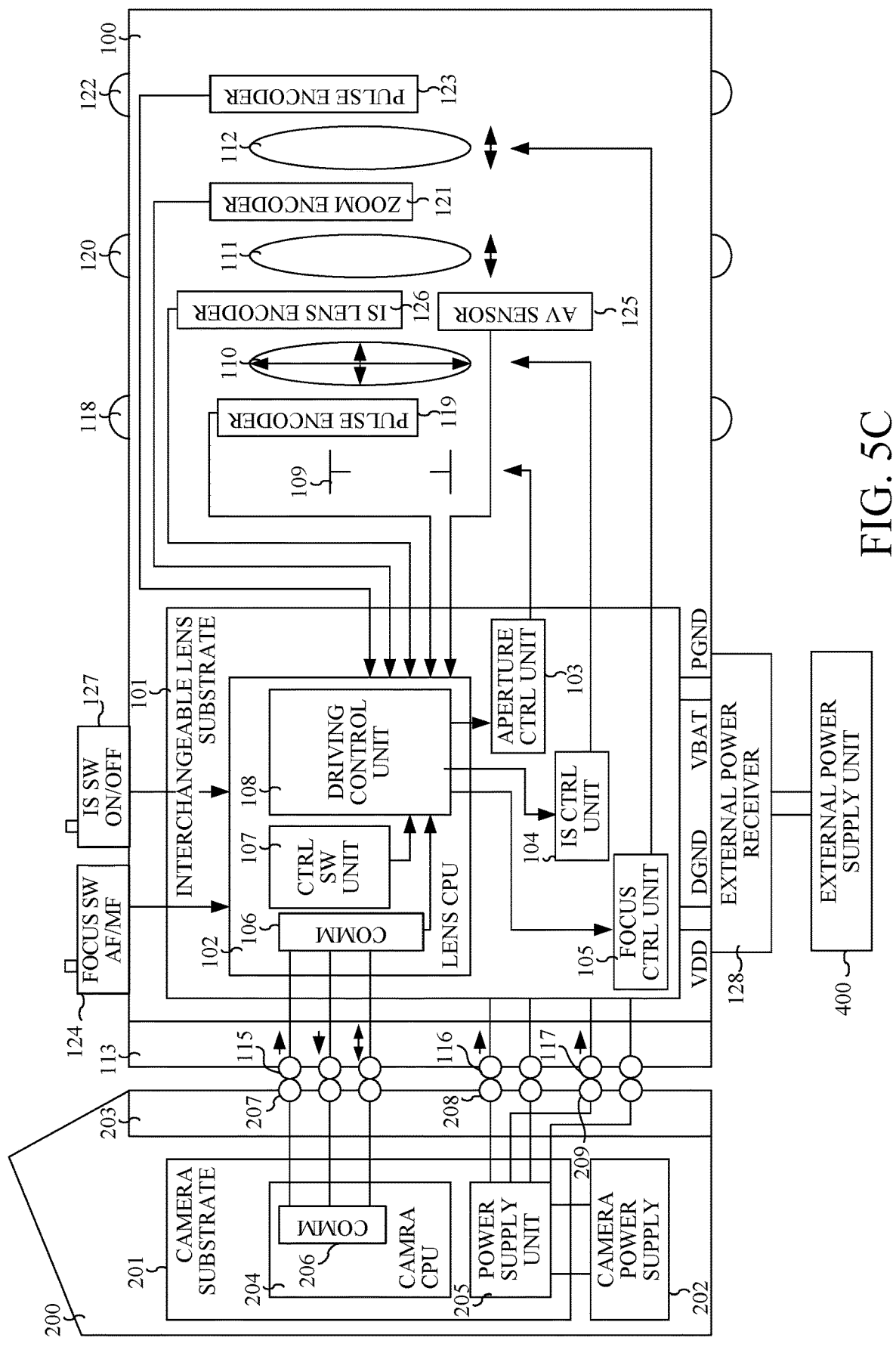
FIG. 5C illustrates a third configuration of the interchangeable lens according to the second embodiment.

FIGS. 5A to 5C illustrate first, second, and third configurations of the interchangeable lens 500, respectively. In the first configuration, the interchangeable lens 500 is attached to the camera 200 and supplied with power by the camera 200. In the second configuration, the interchangeable lens 500 is connected to an external power supply unit 400 and supplied with power from the external power supply unit 400. In the third configuration, the interchangeable lens 500 is attached to the camera 200 and the external power supply unit 400, and supplied with power from the camera 200 and the external power supply unit 400.

Figure 6:
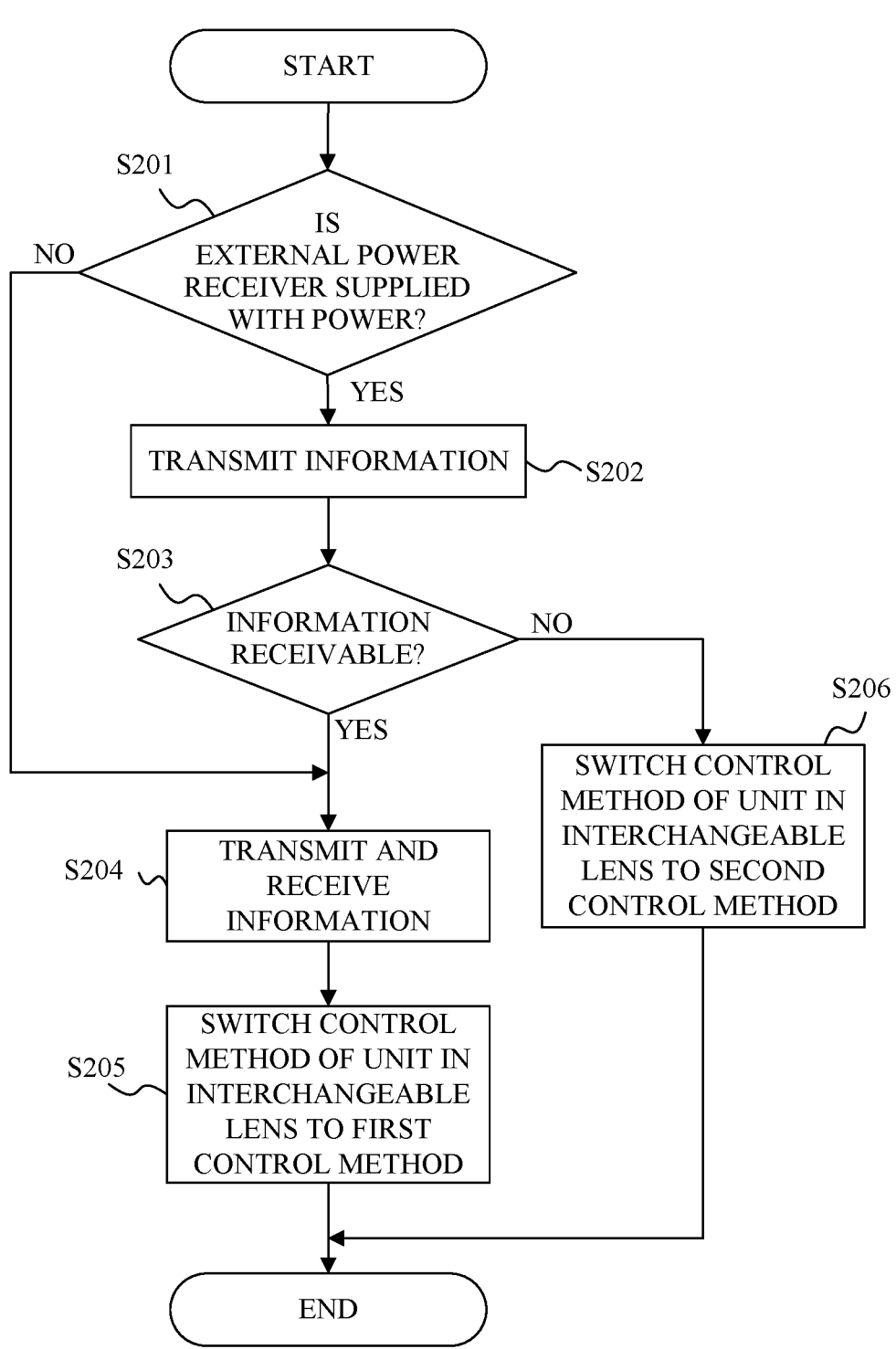
FIG. 6 is a flowchart illustrating switching processing of a control method of a unit in the interchangeable lens according to the second embodiment.

A description will now be given of the switching processing of the control method of the unit in the interchangeable lens 500 according to this embodiment. FIG. 6 is a flowchart illustrating the switching processing of the control method of the unit in the interchangeable lens 500 according to this embodiment. This flow is started in a case where the logic system power terminals 116 receive the logic system power supply and the interchangeable lens CPU 102 is activated.

In step S201, the interchangeable lens CPU 102 determines whether the external power receiver 128 is receiving power. In a case where it is determined that the external power receiver 128 is receiving power, that is, in a case where the interchangeable lens 500 is in the second configuration or the third configuration, the processing of step S202 is executed. In a case where it is determined that the external power receiver 128 is not receiving power, that is, in a case where the interchangeable lens 500 is in the first configuration, step S204 is executed.

In step S202, the interchangeable lens CPU 102 transmits information via the communication unit 106.

In step S203, the interchangeable lens CPU 102 determines whether the communication unit 106 can receive information. In a case where it is determined that the communication unit 106 can receive information, that is, in a case where the interchangeable lens 500 has the third configuration, step S204 is executed. In a case where it is determined that the communication unit 106 cannot receive information, that is, in a case where the interchangeable lens 500 has the second configuration, step S206 is executed.

In step S204, the interchangeable lens CPU 102 causes the communication unit 106 to transmit and receive information.

In step S205, the control switching unit 107 switches the control method of the unit in the interchangeable lens 100 of the driving control unit 108 to the first control method.

In step S206, the control switching unit 107 switches the control method of the unit in the interchangeable lens 100 of the driving control unit 108 to the second control method.

In this embodiment, in a case where the interchangeable lens 100 has the first configuration and the third configuration, the driving control unit 108 controls the unit in the interchangeable lens 100 using the first control method. In a case where the interchangeable lens 100 has the second configuration, the driving control unit 108 controls the unit in the interchangeable lens 100 using the second control method.

In this embodiment, the determining unit 108*a* determines that the interchangeable lens 100 is attached to the camera 200 in a case where the communication unit 106 can receive information from the image pickup apparatus, but the disclosure is not limited to this example. The determining unit 108*a* may determine whether the interchangeable lens 100 is attached to the camera 200 by using the state of the operation unit that enables the user to select whether the interchangeable lens 100 is attached to the camera 200. The determining unit 108*a* may determine that the interchangeable lens 100 is attached to the camera 200 by using the state of a switch that switches between turning on and turning off of the power reception of an internal circuit.

This embodiment can provide a control apparatus that can control the unit in the interchangeable lens even in a case where the interchangeable lens is not attached to the camera.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-113847, filed on Jul. 15, 2022, which is hereby incorporated by reference herein in its entirety.

What is claimed is:

1. A control apparatus configured to control an interchangeable lens attachable to, detachable from, and communicable with an image pickup apparatus, and including a unit, the control apparatus comprising:

a memory storing instructions; and a processor that executes the instructions to:

determine whether the interchangeable lens is attached to the image pickup apparatus, control the unit using at least one of information from the image pickup apparatus and information from the interchangeable lens in a case where the interchangeable lens is attached to the image pickup apparatus, and control the unit using information from the interchangeable lens in a case where the interchangeable lens is not attached to the image pickup apparatus.

2. The control apparatus according to claim 1, wherein the processor is configured to:

determine that the interchangeable lens is attached to the image pickup apparatus in a case where the interchangeable lens can receive a signal from the image pickup apparatus, and determine that the interchangeable lens is not attached to the image pickup apparatus in a case where the interchangeable lens cannot receive the signal from the image pickup apparatus.

3. The control apparatus according to claim 1, wherein the interchangeable lens includes a first power receiver configured to receive power from the image pickup apparatus, and wherein the processor is configured to:

determine that the interchangeable lens is attached to the image pickup apparatus in a case where the first power receiver is receiving the power, and determine that the interchangeable lens is not attached to the image pickup apparatus in a case where the first power receiver is not receiving the power.

4. The control apparatus according to claim 1, the interchangeable lens includes a first power receiver configured to receive power from the image pickup apparatus, and a second power receiver configured to receive power from an apparatus different from the image pickup apparatus, wherein the processor is configured to:

determine that the interchangeable lens is attached to the image pickup apparatus in a case where the first power receiver is receiving the power, and determine that the interchangeable lens is not attached to the image pickup apparatus in a case where the second power receiver is not receiving the power.

5. The control apparatus according to claim 1, wherein the interchangeable lens includes a focus lens, and a first operation member configured to operate manual focus, wherein the unit is the focus lens, and wherein the processor is configured to:

control the focus lens in a focus mode set by a user or in a focus mode based on information from the image pickup apparatus in a case where the interchangeable lens is attached to the image pickup apparatus, and control the focus lens in a manual focus mode in a case where the interchangeable lens is not attached to the image pickup apparatus.

6. The control apparatus according to claim 1, wherein the interchangeable lens includes an image stabilizing lens, and a second operation member configured to set turning on and turning off image stabilization, wherein the unit is the image stabilizing lens, and wherein the processor is configured to:

control the image stabilizing lens using information from the image pickup apparatus in a case where the interchangeable lens is attached to the image pickup apparatus, and control the image stabilizing lens in a case where the interchangeable lens is not attached to the image pickup apparatus and the image stabilization of the second operation member is turned on.

7. The control apparatus according to claim 1, wherein the interchangeable lens includes a diaphragm unit, and a third operation member configured to operate an operation target set by the image pickup apparatus, and wherein the unit is the diaphragm unit, and wherein the processor is configured to:

control an operation target set by the image pickup apparatus in a case where the interchangeable lens is attached to the image pickup apparatus, and control the diaphragm unit in a case where the interchangeable lens is not attached to the image pickup apparatus.

8. An interchangeable lens attachable to, detachable from, and communicable with an image pickup apparatus, the interchangeable lens comprising:

a control apparatus; and a unit, wherein the control apparatus includes:

a memory storing instructions; and a processor that executes the instructions to:

determine whether the interchangeable lens is attached to the image pickup apparatus, control the unit using at least one of information from the image pickup apparatus and information from the interchangeable lens in a case where the interchangeable lens is attached to the image pickup apparatus, and control the unit using information from the interchangeable lens in a case where the interchangeable lens is not attached to the image pickup apparatus.

9. The interchangeable lens according to claim 8, further comprising:

a mount unit configured to attach the interchangeable lens to the image pickup apparatus, and a first power receiver provided to the mount unit and configured to receive power from the image pickup apparatus.

10. The interchangeable lens according to claim 8, further comprising:

a mount unit configured to attach the interchangeable lens to the image pickup apparatus;

a first power receiver provided to the mount unit and configured to receive power from the image pickup apparatus; and a second power receiver provided at a position different from that of the mount unit and configured to receive power from an apparatus different from the image pickup apparatus.

11. A non-transitory computer-readable storage medium storing a program that causes a computer to execute a control method for controlling an interchangeable lens that includes a unit and is attachable to, detachable from, and communicable with an image pickup apparatus, the control method comprising:

determining whether the interchangeable lens is attached to the image pickup apparatus;

controlling the unit using at least one of information from the image pickup apparatus and information from the interchangeable lens in a case where the interchangeable lens is attached to the image pickup apparatus; and controlling the unit using information from the interchangeable lens in a case where the interchangeable lens is not attached to the image pickup apparatus.

\* \* \* \* \*